(12) United States Patent
Trunk et al.

(10) Patent No.: US 10,579,521 B2
(45) Date of Patent: Mar. 3, 2020

(54) ADDRESS ALLOCATION TO PSUS, SERVICE ARRANGEMENT AND PASSENGER CABIN

(71) Applicant: DIEHL AEROSPACE GMBH, Ueberlingen (DE)

(72) Inventors: Lothar Trunk, Weibersbrunn (DE); Stefan Mueller-Diveky, Schoeneck (DE)

(73) Assignee: DIEHL AEROSPACE GMBH, Ueberlingen (DE)

( * ) Notice: Subject to any disclaimer, the term of this patent is extended or adjusted under 35 U.S.C. 154(b) by 0 days.

(21) Appl. No.: 16/165,012

(22) Filed: Oct. 19, 2018

(65) Prior Publication Data

US 2019/0121774 A1   Apr. 25, 2019

(30) Foreign Application Priority Data

Oct. 24, 2017   (DE) .......................... 10 2017 009 880

(51) Int. Cl.
*G06F 12/06*   (2006.01)
*G06F 13/42*   (2006.01)
*B64D 11/00*   (2006.01)

(52) U.S. Cl.
CPC .......... *G06F 12/0653* (2013.01); *B64D 11/00* (2013.01); *G06F 13/42* (2013.01); *G06F 13/4282* (2013.01); *B64D 2221/00* (2013.01); *G06F 2213/0052* (2013.01)

(58) Field of Classification Search
CPC ............ G06F 12/0653; G06F 12/0676; G06F 2213/0052; B64D 11/00; B64D 11/0015; B64D 2011/0053; B64D 2221/00
See application file for complete search history.

(56) References Cited

U.S. PATENT DOCUMENTS

| | | | | |
|---|---|---|---|---|
| 4,835,604 A | * | 5/1989 | Kondo | ...................... H04N 7/10 348/836 |
| 6,393,343 B1 | * | 5/2002 | Frey | ....................... B64D 11/00 244/118.5 |
| 2006/0032979 A1 | * | 2/2006 | Mitchell | ................ B64D 11/00 244/118.6 |
| 2006/0282549 A1 | * | 12/2006 | Vinnemann | ........... H04L 12/403 710/3 |

(Continued)

*Primary Examiner* — Glenn A. Auve
(74) *Attorney, Agent, or Firm* — Scully Scott Murphy and Presser

(57) ABSTRACT

A method for allocating addresses to passenger service units (PSUs) and a service controller for a passenger cabin of an aircraft are provided. A coding device of the controller defines multiple coding parameters each corresponding to an installation position of a PSU. Each coding parameter defines a coding value. The PSUs are installed at respective installation positions in an installation space. A head unit of the controller communicates with the PSUs. In response to a start command, a respective coding value is determined at a respective installation position of a respective PSU. A respective waiting time is determined from the respective coding value according to a time rule. A response is transmitted to the head unit for each PSU upon expiration of the waiting time from the start command. Upon receiving the response, an address is allocated to a PSU which transmitted the response.

15 Claims, 2 Drawing Sheets

(56) References Cited

U.S. PATENT DOCUMENTS

| | | | | |
|---|---|---|---|---|
| 2010/0096919 A1* | 4/2010 | Meckes | ............... | B64D 11/00 |
| | | | | 307/9.1 |
| 2014/0189078 A1* | 7/2014 | Ibrahim | ............ | H04L 12/6418 |
| | | | | 709/221 |
| 2014/0215534 A1* | 7/2014 | Meckes | ............... | B64D 11/00 |
| | | | | 725/75 |
| 2015/0094882 A1* | 4/2015 | Riedel | ............. | B64D 11/0015 |
| | | | | 701/3 |
| 2015/0355988 A1* | 12/2015 | Lee | ................... | G06F 11/273 |
| | | | | 714/27 |
| 2016/0090192 A1* | 3/2016 | Dunn | .............. | B64D 11/0015 |
| | | | | 340/945 |
| 2018/0097685 A1* | 4/2018 | Jouper | ............. | G06F 12/0669 |

* cited by examiner

ADDRESS ALLOCATION TO PSUS, SERVICE ARRANGEMENT AND PASSENGER CABIN

BACKGROUND

The invention relates to a method for allocating a respective address to a plurality of PSUs (Passenger Service Units) of a service controller for a passenger cabin of an aircraft. The invention also relates to the service controller and the passenger cabin.

It is known that, in practice, PSUs can be incorporated into a cabin management system via a multiplicity of individual connection wires. This requires a very large amount of cabling and thus, modifications can only be made at a very high cost, since the aircraft cabling has to be adapted with every modification.

SUMMARY

The present invention is directed to the improvement of the incorporation of PSUs.

The method of the present invention serves to allocate a respective address to a plurality of PSUs. The PSUs form part of a service controller for a passenger cabin of an aircraft. The aircraft can be, for example, a passenger aircraft.

The service controller includes a coding means. The coding means extends along an extension line in an installation space. The PSUs can be accommodated or installed in the installation space. In the installed state of the PSUs in the passenger cabin, the installation space forms a subspace of the internal space of the passenger cabin. The extension line is a straight line, which extends in the installed state in the passenger cabin in the longitudinal direction of the aircraft. The coding means define coding values of a coding parameter for different positions on the extension line where the PSUs are installable. The coding values differ on a pair-by-pair basis. In other words, the presence of identical coding values at the installation positions of two PSUs is avoided in any given configuration of PSUs. A continuous positioning of PSUs is thus possible. The geometric extension of a PSU automatically creates a distance between the measuring points on the coding means (with respect to installation positions). Thus, two PSUs cannot be installed at the same location.

The service controller includes the aforementioned plurality of PSUs. The PSUs are installed along the extension line in the installation space at one of the respective installation positions on the extension line. This concerns the installed state when the service arrangement is installed in the passenger cabin.

In particular, each of the PSUs has a sensor. The sensor serves to detect the respective coding value of the coding means at the installation positions of the respective PSUs. The service controller furthermore includes a head unit for communication with the PSUs which is connected to the PSUs via a communication channel.

In the method, a start command is transmitted to all PSUs. In particular, the head unit transmits the start command to all PSUs. In particular, the start command is transmitted via the communication channel.

In response to the start command, a respective coding value is determined for each PSUs at the installation position of the each respective PSU. In particular, each of the PSUs determines its respective coding value. In particular, the coding value is determined by means of the sensor.

A waiting time is then determined for the respective PSU from the respective determined coding value for each of the PSUs according to a time rule. In particular, each of the PSUs determines its waiting time. The time rule is the same for all PSUs. The time rule maps the coding values linearly into waiting times. The time rule and coding values are matched to one another in such a way that all waiting times differ from one another on a pair-by-pair basis for all possible configurations (based on the choice of installation positions) of PSUs. No two PSUs therefore have the same waiting times.

Beginning at the time when the start command is received, the respective waiting time is then awaited for each PSU. At the expiration of the waiting time, a response is transmitted from the respective PSU to the main unit, for example, via the communication channel. The PSU waits for the respective amount of time, and therefore has an internal time management. The PSU can also transmit the respective response itself. Durations of the start command are ignored here, i.e. the transmission time of the start command is equal to the reception time at all PSUs. Due to the guarantee of different waiting times, all responses of all PSUs are therefore transmitted at different times. The waiting time therefore begins with the transmission of the start command. The response is transmitted when the waiting time ends. The duration of the responses is again ignored.

In response to the reception of a respective response at the head unit, one of the addresses, which differ respectively on a pair-by pair basis, is allocated to the PSU which had transmitted the corresponding received response. The allocation is performed, for example, by the head unit itself. The responses are allocated to the respective PSU which transmitted the response, for example by means of a unique identification which is included in the response. A respectively unique or different address is thus allocated to each of the successively responding PSUs. All PSUs can now be addressed or communicated with singly and individually using their respective individual different address.

The time intervals between two responses are sufficiently separated by the time rule or the parameters of the coding values and therefore the dimensioning of possible waiting times in order to be able to uniquely distinguish the responses and therefore the respectively responding PSUs. A unique address allocation can thus be performed.

An automatic addressing method for a PSU in an aircraft is produced according to the invention. To summarize briefly, a unique address is allocated to each PSU using the coding means.

In one embodiment, the communication channel is used as a data bus and the address is used as the bus address of the respective PSU in the data bus. The data bus is thus suitable for any given data communication between the head unit and the PSUs, in particular for the targeted individual transmission of audio, video and other data between any given bus participants (head unit, PSUs).

In one embodiment, the waiting time is determined on the basis of the time rule as the coding value, multiplied by a constant. This therefore produces a particularly simple linear mapping of the coding values onto waiting times. Different waiting times are thus guaranteed for different coding values. The guarantee of different coding values at all conceivable installation positions for every conceivable configuration of PSUs thus ensures the difference in waiting times.

In one embodiment, the above-mentioned communication channel forms at least part of a power supply arrangement of the PSUs. The communication on the communication channel is implemented in the form of a power line communication on the power supply arrangement. No separate signal paths or communication paths are thus necessary for the power supply and the communication connection of the PSUs, thereby reducing costs and effort.

In one embodiment, the addresses are allocated to the PSUs in ascending order in the sequence of the incoming responses. Since, as explained above, it is ensured that no two responses of two PSUs arrive simultaneously, it is also ensured that all PSUs obtain different ascending addresses.

The present invention is further directed to a service controller for a passenger cabin of an aircraft. The service controller and at least some of its embodiments and the respective advantages have already been explained accordingly in connection with the method according to the invention.

The service controller includes a coding means extending in an installation space (part of the service arrangement) for the PSUs along an extension line, wherein the coding means has coding values of a coding parameter, at different installation positions on the extension line. The coding values differ on a pay-by-pair basis. The service controller contains the plurality of PSUs which are installable or are installed in the installed state along the extension line in the installation space at one of the respective installation positions on the extension line.

For example, each of the PSUs has a sensor detecting the respective coding value of the coding means at its installation position.

The service controller includes a head unit which is connected to the PSUs for communication, in particular via a communication channel (as part of the service controller).

The service controller includes a control unit which is configured to implement the method according to the invention.

In one embodiment, the coding parameter is an electrical potential or electrical voltage. A coding parameter of this type can be generated in an aircraft simply and at low cost by a coding means. A coding parameter of this type can be further processed by simple and low-cost sensors.

In one variant of this embodiment, in the case of using an electrical voltage as the coding parameter, the electrical voltage is non-zero at any of the installation positions. In the case of using an electrical potential as the coding parameter, the electrical potential does not correspond to a reference potential used in the measurement, in particular a reference potential of the sensor, at any of the installation positions. Zero measurements can therefore be recognized unequivocally as errors, since, in the error-free case, a non-zero voltage or potential difference must always be determined as a coding value.

In one variant of this embodiment, the coding means is a resistor element, for example a resistor wire. A non-zero voltage is present at the longitudinal ends of the resistor wire along the extension line during operation. A current thus flows through the resistor element during operation. The voltage may be a DC or AC voltage, which, for example, has an amplitude or amount that is constant at least for the duration of the address allocation. The electrical potential thus inevitably drops continuously along the resistor element, so that a different potential or voltage is inevitably present as a value of the coding parameter at each potential installation location.

In one embodiment, the service controller includes a rail system installable in the passenger cabin. The rails system includes at least one rail for mechanically connecting at least one of the PSUs. The rail can extend over at least two installation locations for PSUs. It is possible for the rail to extend over all installation locations. Thus, a simple reconfiguration of the PSUs through displacement along the rail is made possible. As a result, the invention offers the convenience to carry out an automatic address allocation to all PSUs following any displacement.

In one variant of this embodiment, the rail system can be integrated into an overhead bin of the passenger cabin. A simple installation and also any given reconfiguration of the PSUs in the installation space, in particular below the bins, is thus possible. In particular, in the installed state, the rails of the rail system run along the longitudinal direction of the bins in the aircraft. In the event of a reconfiguration, seats or rows of seats in an aircraft are normally shifted or moved in the longitudinal direction of the aircraft, which necessitates an adjustment of the respective PSUs in precisely this longitudinal direction. This can be done in a particularly simple manner by means of the rail system running in this direction.

In one variant of this embodiment, at least one of the rails is configured for the power supply of the PSUs. Alternatively, at least one of the rails is configured for communicating the PSUs with one another. Alternatively, the at least one rail is configured for communicating the PSUs with the control unit, for example, for forming the communication channel. Along with the mechanical retention of the PSUs, the rails thus fulfil further functions, i.e. the power supply and/or communication connection of the PSUs. In particular, two rails are provided for the power supply. In particular, the same rails are provided simultaneously for the communication connection in the sense of a power line communication. The communication channel thus forms part of the rail system. This results in a particularly simple and low-cost design.

In one variant of this embodiment, at least one of the rails includes or forms the coding means. In particular, a third rail is provided along with the aforementioned two rails for this purpose.

In one embodiment, the head unit and/or the control unit and/or at least one of the PSUs contain(s) an interface to a cabin management system of the passenger cabin and/or to a power or current/voltage supply of the passenger cabin and/or to an oxygen mask signal of the passenger cabin and/or a voltage converter and/or, in the case of at least one rail, these elements have an electrical power connection and/or signal connection to the rail.

By means of the interface to the cabin management system, the communication channel or data bus can have a data communication connection to the cabin management system and all PSUs can therefore also communicate with the cabin management system. Electric power or energy can be provided for the rail system and thus for the supply of the PSUs by means of the connection to the power supply. By means of the connection to the oxygen mask signal, the corresponding functionality can also be made available via the communication channel and/or the rail system.

In the case of a rail system comprising at least one rail, the head unit has a power and/or signal connection to the rail. The supply power can thus be fed into the rail system or the data connection of the rail system can thus be implemented.

The present invention is further directed to passenger cabin of an aircraft. The passenger cabin and at least some of its embodiments and the respective advantages have already been explained accordingly in connection with the method according to the invention and the service controller according to the invention.

The passenger cabin includes a service controller according to the invention. The PSUs are installed on a support structure in the passenger cabin. The support structure is a structural part of the cabin, for example, an overhead bin. The installation is performed by means of the aforementioned rail system.

The invention is based on the following realizations, observations or considerations and also comprises the following embodiments. The embodiments are also referred to partly for simplification as "the invention". Here, the embodiments may also contain parts or combinations of the aforementioned embodiments or may correspond thereto and/or may possibly also include hitherto unmentioned embodiments.

According to the invention, simplifying an incorporation of PSUs into the cabin management system and the aircraft layout can be further achieved, and simultaneously reducing the manufacturing costs of the aircraft manufacturer can also be achieved. Power line communication can be used here. According to the invention, a PSU is connected in an aircraft via a three-conductor rail system. The necessary bus address of the PSU is calculated by means of a conductor which can be designed as a resistor wire.

A rail system for connecting the PSUs is also proposed according to the invention. The communication takes place via the power supply. Two conductor rails are required here. A third conductor rail is designed as a resistance conductor. 28 V DC are connected at the start of the rail system. A terminating resistor is provided at the end of the rail system. This ensures that a minimum voltage of, for example, 5 V DC is set at the end (must be non-zero if interruptions are also to be detectable). The supply voltage and the communication are connected to the bus in a head unit. The head unit starts the bus configuration via a command (start command). Each PSU (or a control unit) connected to the rail system now determines a unique bus address from the voltage (coding value) measured at the local position (installation position). Since the voltage decreases continuously on the resistance conductor, there is no ambiguity. The response time is also derived from the measured voltage value, so that no bus collision occurs.

According to the invention, the bus address in a rail system is determined by means of a dedicated voltage drop in the resistance conductor.

An intelligent flexible PSU (iFlexPSU) is created according to the invention. This results in an intelligent, movable, modular, scalable, flexible and future-oriented PSU family for a multi-program platform use. Thanks to the power supply via the communication bus, it requires only three connections instead of a multiplicity of individual wirings. The PSU is installed and connected by means of a rail system which can be integrated into overhead bins. In combination with an automatic addressing capability, the installation, configuration and reconfiguration can be carried out in a few minutes.

The PSU family enables a very cost-effective (with standard functions) or high-performance solution (with extended functions: wireless seat monitoring, extended cabin temperature control, video, predictive health monitoring, passenger information, safety instructions, etc.). Standard functions are, in particular, "fasten seat belts" sign, reading light, call button for cabin crew, call display, no smoking sign, "PEDs in flight mode" sign). Video functions are, in particular, a moving map, safety videos, advertising, passenger guidance or local video storage.

The PSU family offers the following benefits for original equipment manufacturers and airlines: simple and quick to install, substantial reduction in aircraft manufacturing costs, simple and fast change of LOPA (Location of Passenger Accommodation), operational efficiency improvement (especially with high-end PSUs with extended functionality), weight reduction, retrofit capability, extended functionality for passengers and airline and future-oriented product, cost saving due to reduced cabling, reduction in aircraft manufacturing time, simple and fast installation in the final production line, reduction in weight, volume and complexity.

The PSU enables a smart passenger cabin reconfiguration, of the type known, for example, from the publication entitled "'Crystal Cabin Award/These are 2017's best concepts for the aircraft cabin', Crystal Cabin Award Association, do Hamburg Aviation, Wexstrasse 7, D-20355 Hamburg, http://www.crystal-cabin-award.com/cca-news-realeases/article/these-are-2017s-best-concepts-for-the-aircraft-cabin.html".

The invention is based on a flexible combination of power line communication, a method for supporting automatic PSU addressing and a rail system concept for flexible installation and positioning, including reliable electrical connections.

The PSU is connected via the rail system to the head unit. It includes the necessary electronics for a low-cost or high-end solution. Both versions are exchangeable. Future applications can be simply integrated. The mechanical system can be designed in such a way as to support a simple installation and removal.

The rail system includes two lines for power and communication and one line with a higher resistance for automatic addressing purposes. Rail-to-rail connectors allow a simple pre-integration, for example in overhead bins. The connection elements can be designed with great care in terms of environmental requirements.

The head unit is connected to the CMS (Cabin Management System), the aircraft power supply and the "oxygen mask trigger signal" from the cockpit. The head unit converts the aircraft power to 28 V for the PSU bus (power supply) and also incorporates the communication information (communication channel) on said PSU bus.

The oxygen masks can also be triggered with a different electronic solution with the appropriate design safety level, implemented in the head unit and the PSU.

The PSU enables the original equipment manufacturers to further reduce their production costs and reduce the aircraft manufacturing time. The original equipment manufacturers and the airlines are given a high degree of flexibility in terms of modification of the LOPAs and improvement of functionality with regard to operation, maintenance and passenger comfort.

BRIEF DESCRIPTION OF THE DRAWINGS

Further features, effects and advantages of the invention are set out in the following description of one preferred example embodiment of the invention, and also in the attached figures. In a schematic diagram:

DETAILED DESCRIPTION OF EMBODIMENTS

Figure 1:
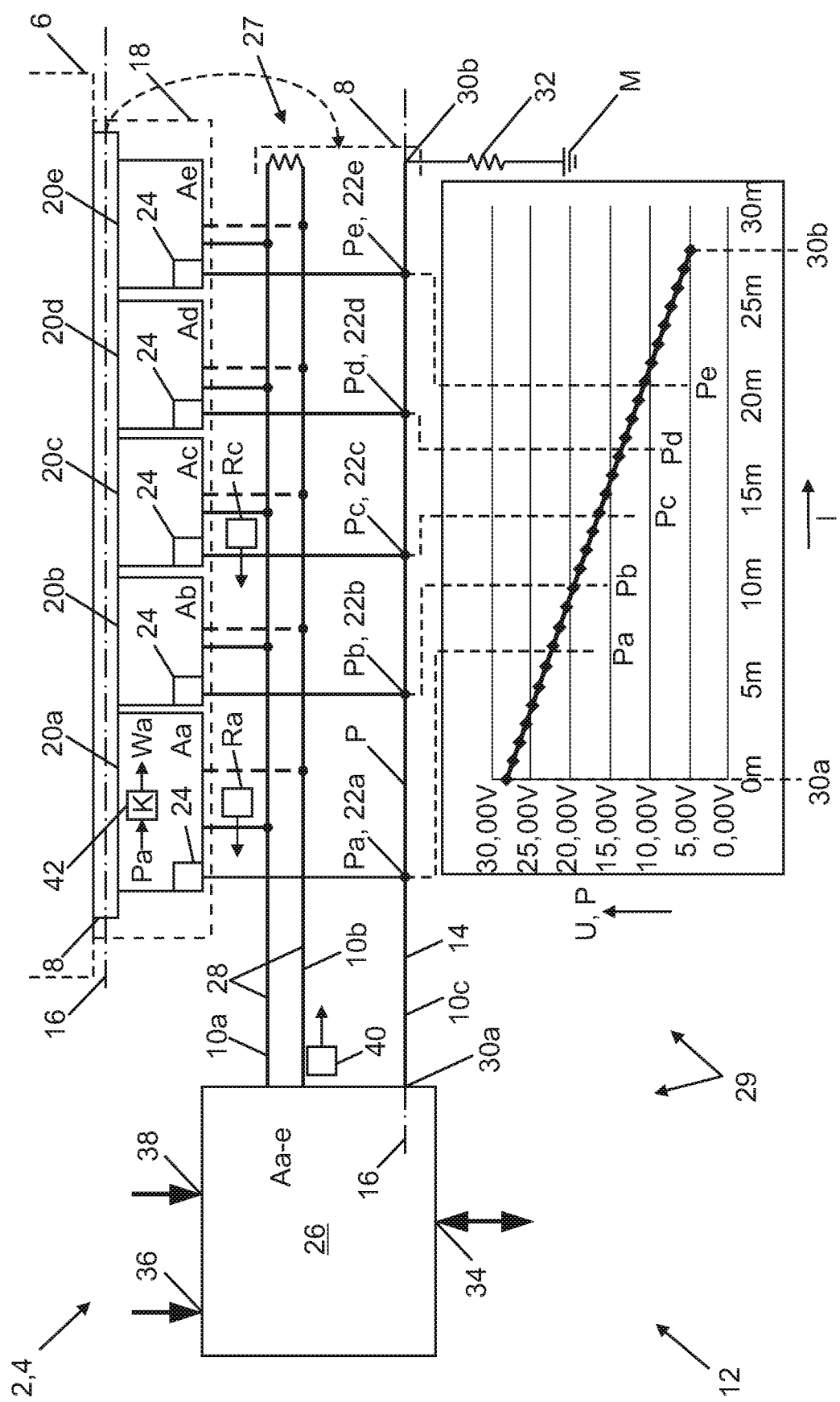
Figure 2:
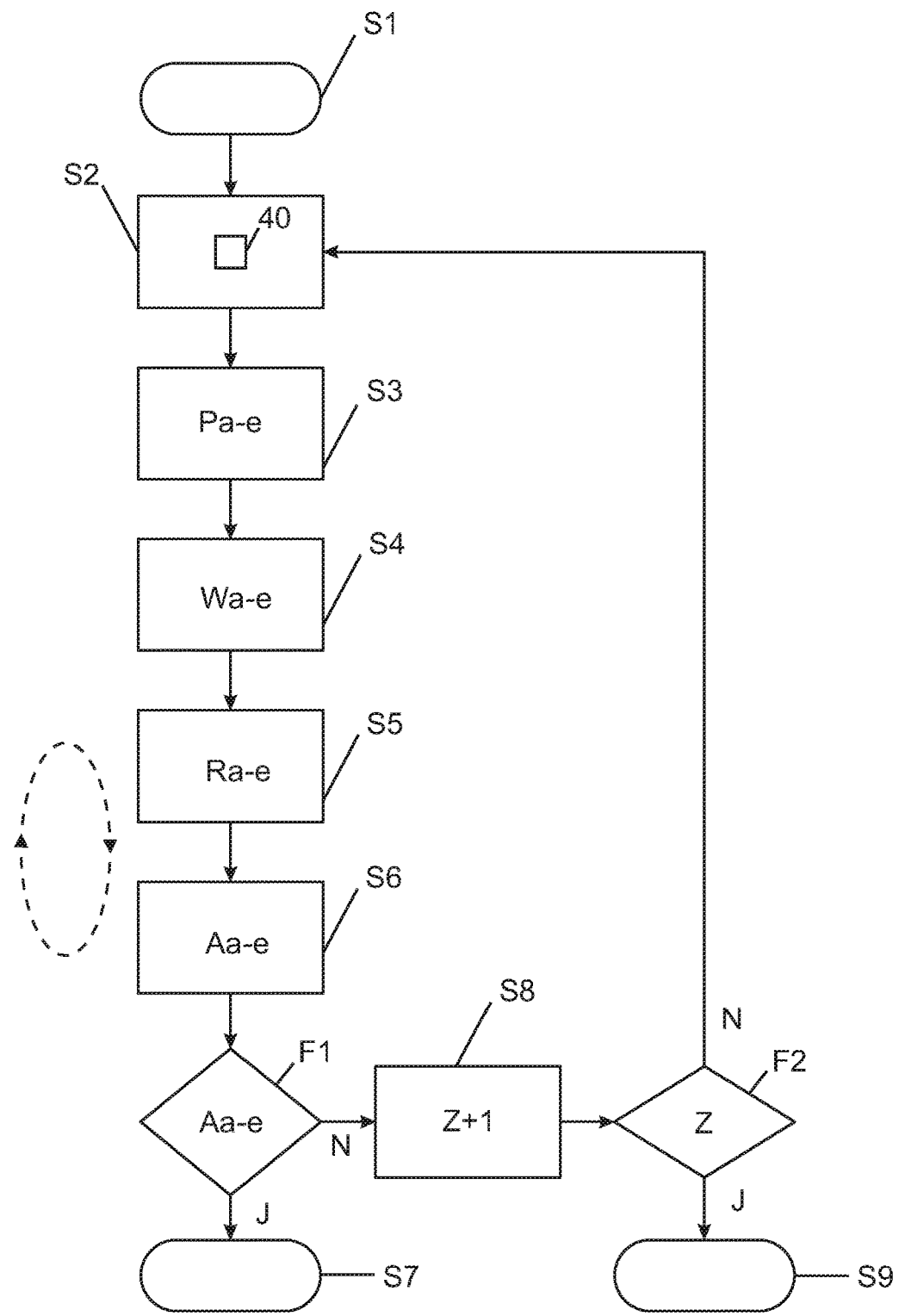

FIG. 1 shows a passenger cabin of an aircraft with a service controller,

FIG. 2 shows a flow diagram for an address allocation method.

FIG. 1 shows a section of an aircraft 2 (not shown in detail), here a passenger aircraft or its passenger cabin 4. Only some overhead bins 6 from the passenger cabin are indicated symbolically. A rail system 8 is fitted on the underside of the overhead bins 6 facing towards rows of seats (not shown), said rail system having a total of three rails 10a-c and being shown symbolically or functionally (indicated by a dotted arrow) for clarification in FIG. 1. The rail system 8 forms part of a service controller 12 which is installed in the passenger cabin 4.

The service controller 12 furthermore includes a coding means 14 which extends along an extension line 16. In the present case, the coding means is designed as a rail 10c, and for this reason the extension line 16 is also shown again symbolically in FIG. 1. The extension line 16 extends within an installation space 18 which represents a roofed part of the passenger cabin 4.

The installation space 18 is furthermore provided for the purpose of installing PSUs in it as required, here according to the arrangement of the rows of seats (not shown), in each case at a correspondingly required installation position 22a-e on the extension line 16. In the example, the service controller 12 includes five PSUs 20a-e.

The overhead bins 6 thus form a support structure 25 for the PSUs 20a-e or the service controller 12.

The coding means 14 has a coding parameter P, here an electrical potential. Coding values Pa-e of the coding parameter P differ on a pair-by-pair basis at all installation positions 22a-e. In FIG. 1, the electrical potential is related to a reference potential M, which is the ground potential in this embodiment. In relation to the potential P, the respective potential difference P-M is therefore referred to synonymously as the voltage U.

Each PSU 20a-e has a sensor 24 which detects the respective coding value Pa-e of the coding parameter P at the respective installation position 22a-e. As indicated symbolically, the detection is performed here through high-impedance tapping of the respective potential (coding parameter) P on the rail 10c at the installation positions 22a-e.

The service controller 12 furthermore includes a head unit 26 which is connected to the PSUs 20a-e via a communication channel 28. In the example, the rails 10a,b are used for the power supply of the PSUs 20a-e. The communication channel 28 is formed by a power line communication on the rails 10a,b. The communication channel 28 therefore forms part of a power supply arrangement 27 (rails 10a,b for the power supply) of the PSUs 20a-e. The communication on the communication channel 28 is implemented in the form of a power line communication on the power supply arrangement 27. The rails 10a,b are therefore configured for the power supply of the PSUs 20a-e and for the formation of the communication channel 28.

In this embodiment, the coding parameter P is generated in such a way that a potential (for example, P=28 V (in relation to the reference potential M=0V)) is applied or fed in by the head unit 26 at a first end 30a of the rail 10c. The coding means 14 is a resistance element, which in this embodiment is a resistance wire. A terminating resistor 32 which, together with the resistance wire, is dimensioned so that a 5V drop occurs over the terminating resistor 32 is connected at the opposite end 30b. A potential P=5 V is therefore present at the end 30b. On the entire coding means 14, no potential P therefore corresponds to the reference potential in the form of the reference potential M=0V. The rail 10c or the coding means 14 is therefore also referred to as the address cable.

The characteristic of the coding parameter P in the form of the voltage U (in V) over a length I of the extension line 18 (in m) is shown symbolically in a diagram in FIG. 1. The ends 30a,b of the rail 10c and the installation positions 22a-e of the PSUs 20a-e are therefore shown in the drawing.

The head unit 26 furthermore has an interface 34 to a cabin management system (not shown) of the passenger cabin 4, and also an interface 36 or a power input to a voltage supply (similarly not shown) of the passenger cabin 4, and also an interface 38 to an oxygen mask signal (similarly not shown) of the passenger cabin 4.

The head unit 26 has an electrical power connection to the rails 10a,b in order to ensure the power supply of the PSUs 20a-e. It also has a signal connection to the rails 10a,b in order to exchange corresponding data with the communication channel 28 formed accordingly on the rails 10a,b. The head unit 26 and the PSUs 20a-e together form a control unit 29 which is configured to implement the method explained below with FIG. 2.

FIG. 2 shows symbolically in a flow diagram 38 the characteristic of the coding parameter P (here in the form of a voltage U in V) in relation to the reference potential M, plotted over a length I of the passenger cabin 4. The characteristic is shown over the entire length of the coding means 14 from the end 30a to the end 30b. In The respective coding values Pa-e at the respective installation positions 22a-e are shown in the drawing.

FIG. 2 shows a flow diagram for a method for allocating a respective address Aa-e to the PSUs 20a-e.

In a step S1, a new addressing is started.

In a step S2, the head unit 26 transmits a start command 40 via the communication channel 28 to all PSUs 20a-e.

In a step S3, each of the PSUs 20a-e, in response to receiving the start command 40, determines the respective coding value Pa-e of the coding parameter P at its respective installation position 22a-e by means of its respective sensor 24.

In a step S4, each of the PSUs 20a-e determines a respective waiting time Wa-e from the determined coding values Pa-e by means of the same time rule 42 (shown by way of example in FIG. 1 for the PSU 20a only). The determination is carried out in the form of a multiplication Wa-e=K*Pa-e of the coding value Pa-e by a constant K.

In a step S5, the respective PSU 20a-e waits for its respective time Wa-e as from the time when the start command 40 is received. At the time when the waiting time Wa-e expires, the respective PSU 20a-e transmits a respective response Ra-e to the head unit 26.

In a step S6, the head unit 26 allocates an address Aa-e to the respective PSU 20a-e which transmitted the respective response Ra-e. Steps S5 and S6 are carried out, in particular, in nested form (indicated by a dotted arrow) for all PSUs 20a-e.

In a query step F1, the number of PSUs 20a-e to which an address Aa-e has been allocated is checked against the known number of PSUs 20 actually installed in the passenger cabin 4. If the number matches (Y, Yes), the addressing is ended in a step S7. If the number does not match (N, No), an error counter Z initially set to 0 is incremented by the value one in a step S8.

The error counter Z is checked in a query step F2. If the error counter Z exceeds a permitted limit, here the value 5 (Y), the method is ended with the "addressing error" status in a step S9. If the limit is not exceeded (N), the method returns to step S2.

If the addressing method is successfully completed with step S7, the communication channel 28 is used as a data bus and the addresses Aa-e are used as bus addresses of the respective PSU 20a-e in the data bus.

REFERENCE NUMBER LIST

2 Aircraft
4 Passenger cabin

6 Overhead bin
8 Rail system
10a-c Rail
12 Service controller
14 Coding means
16 Extension line
18 Installation space
20a-e PSU
22a-e Installation position
24 Sensor
25 Support structure
26 Head unit
27 Power supply arrangement
28 Communication channel
29 Control unit
30a,b End
32 Terminating resistor
34 Interface
36 Interface
38 Interface
40 Start command
42 Time rule
P Coding parameter
Pa-e Coding value
M Reference potential
U Voltage
Aa-e Address
Wa-e Waiting time
K Constant
I Length
Ra-e Response
Z Error counter
S1-8 Step
F Query step

What is claimed is:

1. A method for allocating a respective address to a plurality of PSUs (Passenger Service Units) of a service controller for a passenger cabin of an aircraft, wherein the service controller comprises:
a coding means extending along an extension line in an installation space for the PSUs,
wherein the coding means defines a plurality of coding parameters, wherein the plurality of coding parameters each correspond to an installation position of a respective PSU on the extension line, wherein the plurality of coding parameters each define a coding value,
the plurality of PSUs, wherein the plurality of PSUs are installed along the extension line in the installation space at the respective installation positions,
a head unit communicating with the PSUs, wherein:
a start command is transmitted to all PSUs,
the method comprising:
in response to the start command, determining a respective coding value at a respective installation position of a respective PSU,
determining a respective waiting time from the respective coding value of a respective PSU according to a time rule,
transmitting a response to the head unit for each of the PSUs upon expiration of a respective waiting time from the start command, and
in response to receiving a respective response at the head unit, allocating a respective address to the PSU which transmitted the received response.

2. The method according to claim 1, further comprising:
using a communication channel between the head unit and the PSUs is used as a data bus and using the respective address as a bus address of a respective PSU in the data bus.

3. The method according to claim 1, further comprising:
determining the waiting time on the basis of the time rule as a coding value, multiplied by a constant.

4. The method according to claim 1, further comprising:
forming, by a communication channel between the head unit and PSUs, at least part of a power supply arrangement of the PSUs, and
implementing communication on the communication channel in the form of a power line communication on the power supply arrangement.

5. The method according to claim 1, further comprising:
allocating the addresses in ascending order in sequence of the responses arriving at the head unit.

6. A service controller for a passenger cabin of an aircraft, comprising:
a coding means extending along an extension line in an installation space for a plurality of PSUs (Passenger Service Units),
wherein the coding means defines a plurality of coding parameters, wherein the plurality of coding parameters each correspond to an installation position of a respective PSU on the extension line, wherein the plurality of coding parameters each define a coding value,
the plurality of PSUs, wherein the plurality of PSUs are installable along the extension line in the installation space at the respective installation positions,
a head unit connected to the PSUs via a communication channel,
a control unit configured to carry out the method according to claim 1.

7. The service controller according to claim 6, wherein the coding parameters are each an electrical potential or an electrical voltage.

8. The service controller according to claim 7, wherein the electrical voltage is non-zero or the electrical potential does not correspond to a reference potential for a potential at any of the installation positions.

9. The service controller according to claim 7, wherein the coding means is a resistor element, wherein a non-zero voltage is presented at longitudinal ends of the resistor element along the extension line during operation.

10. The service controller according to claim 6, further comprising a rail system installable in the passenger cabin with at least one rail for mechanical connection to the PSUs.

11. The service controller according to claim 10, wherein the rail system is integrated into overhead bins of the passenger cabin.

12. The service controller according to claim 10, wherein the at least one rail is configured to supply power to the PSUs and/or the least one of rail is configured to communicate with the PSUs and the control unit.

13. The service controller according to claim 10, wherein the at least one rail comprises the coding meaning.

14. The service controller according to claim 10, further comprising:
an interface to a cabin management system of the passenger cabin, or
an interface to a power supply of the passenger cabin, or
an interface to an oxygen mask signal of the passenger cabin, or
a voltage converter, or
an electrical power connection, or
a signal connection to the at least one rail.

15. A passenger cabin of an aircraft, comprising a service controller according to claim 6, wherein the PSUs are installed on a support structure in the passenger cabin.

* * * * *